(12) United States Patent
Quan

(10) Patent No.: US 6,839,433 B1
(45) Date of Patent: Jan. 4, 2005

(54) METHOD AND APPARATUS FOR GENERATING A SIGNAL THAT DEFEATS ILLEGAL CABLE DECODERS

(75) Inventor: Ronald Quan, Cupertino, CA (US)

(73) Assignee: Macrovision Corporation, Santa Clara, CA (US)

( * ) Notice: Subject to any disclaimer, the term of this patent is extended or adjusted under 35 U.S.C. 154(b) by 0 days.

(21) Appl. No.: 09/357,691

(22) Filed: Jul. 20, 1999

Related U.S. Application Data

(60) Provisional application No. 60/100,043, filed on Sep. 11, 1999, and provisional application No. 60/093,705, filed on Jul. 22, 1998.

(51) Int. Cl.[7] ............................................. H04N 7/167
(52) U.S. Cl. ................... 380/206; 380/209; 380/210; 725/25; 725/31; 348/470; 713/200; 713/201; 713/163; 713/164; 713/167
(58) Field of Search ............................... 380/206, 209, 380/210; 725/31, 25; 348/478; 713/200, 201, 163, 164, 167

(56) References Cited

U.S. PATENT DOCUMENTS

| | | | | |
|---|---|---|---|---|
| 4,149,186 A | * | 4/1979 | Chung et al. | 358/83 |
| 4,403,252 A | * | 9/1983 | Ragan et al. | 358/114 |
| 4,466,017 A | * | 8/1984 | Banker | 358/120 |
| 4,521,809 A | * | 6/1985 | Bingham et al. | 380/224 |
| 5,022,078 A | * | 6/1991 | Zelenz | 380/7 |
| 5,091,935 A | * | 2/1992 | Meriwether et al. | 380/15 |
| 5,142,575 A | * | 8/1992 | Farmer et al. | 380/15 |
| 5,287,409 A | * | 2/1994 | Westerfer et al. | 380/15 |
| 5,438,620 A | * | 8/1995 | Ryan et al. | 380/15 |
| 5,651,065 A | | 7/1997 | Stufflet | 380/15 |
| 5,768,376 A | | 6/1998 | Chang | 380/15 |
| 6,028,941 A | * | 2/2000 | Kemplin | 380/224 |
| 6,424,716 B1 | * | 7/2002 | Quan | 380/221 |
| 6,459,795 B1 | * | 10/2002 | Quan | 380/221 |

FOREIGN PATENT DOCUMENTS

| | | | | |
|---|---|---|---|---|
| EP | 0543294 | | 5/1993 | |
| WO | WO0005894 | * | 2/2000 | H04N/7/169 |

OTHER PUBLICATIONS

Mattey, Brian, Commercial Use of the VBI, 1994, IEEE, pp. 1–3.*
Cheon et al, Digital Ready TV Platform with Synchronization Shaping Circuit, 2003, IEEE, pp. 220–228.*
Thompson, Wayne, Satellite TV Pirates Will Soon Walk Plank, May 1992, The Oregonian.*

* cited by examiner

Primary Examiner—Ayaz Sheikh
Assistant Examiner—Aravind Moorthy
(74) Attorney, Agent, or Firm—George Almeida

(57) ABSTRACT

Illegal cable decoders, i.e., black boxes, are defeated by adding, inserting and/or superimposing an added signal onto an already scrambled video signal, which added signal is capable of disrupting the operation of the illegal cable decoder. As a result of the added signal, the illegal cable decoder outputs an unstable or unviewable picture or signal and concealment is maintained. In another embodiment of an added signal, a modulated signal with a range from about blanking level to about peak white level is added, inserted and/or superimposed on the unstable scrambled video signal in the vertical blanking interval and/or its vicinity. As a result, the illegal cable decoder is caused to generate some horizontal instabilities at its output. For those illegal cable decoders that utilize color burst as a means to decode, methods to defeat these consist of filling in color burst in the vertical blanking interval area and/or modifying the position of the correct burst while adding an incorrect frequency burst to defeat the illegal cable decoder.

49 Claims, 11 Drawing Sheets

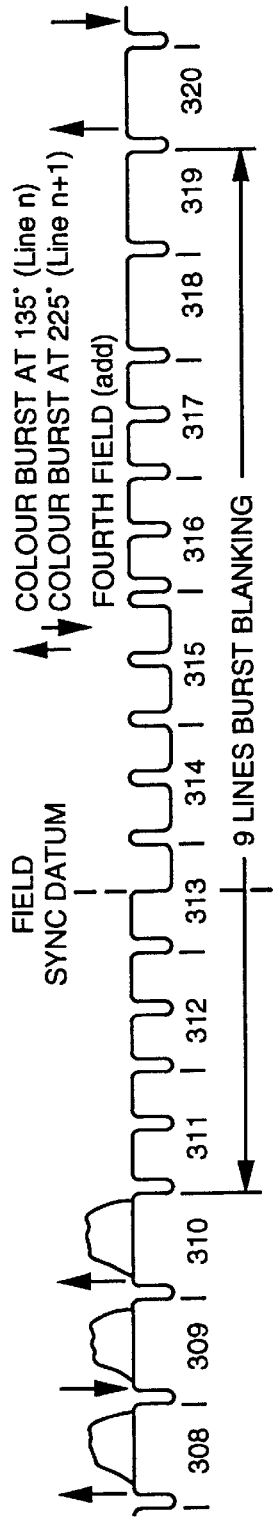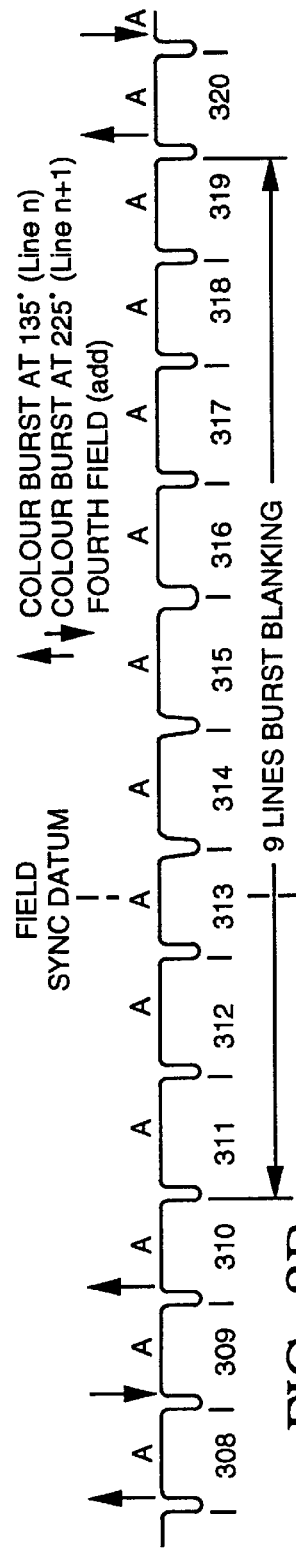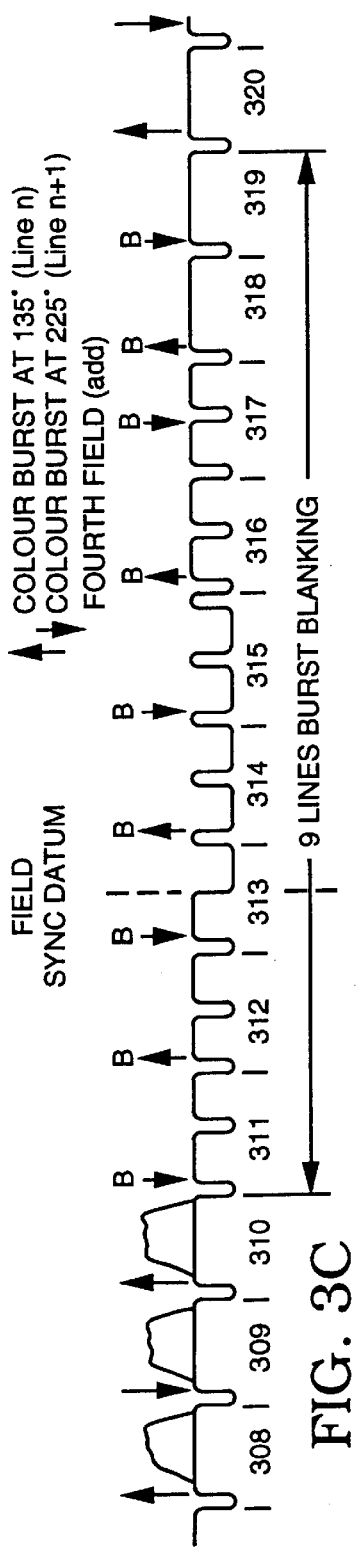

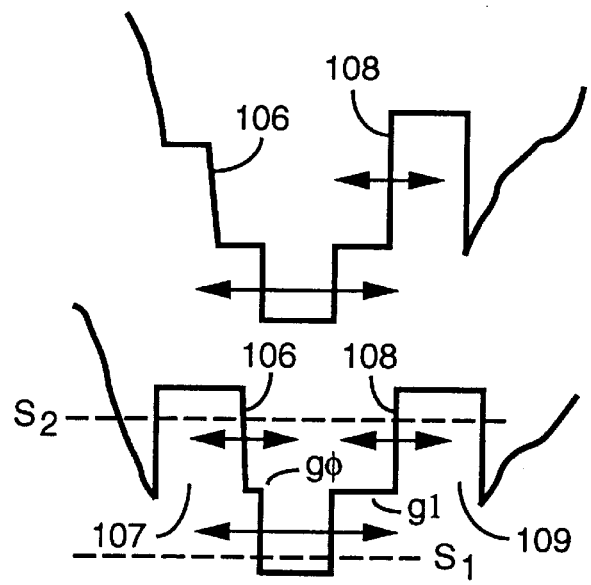
FIG. 8A
(PRIOR ART)
FIG. 8B
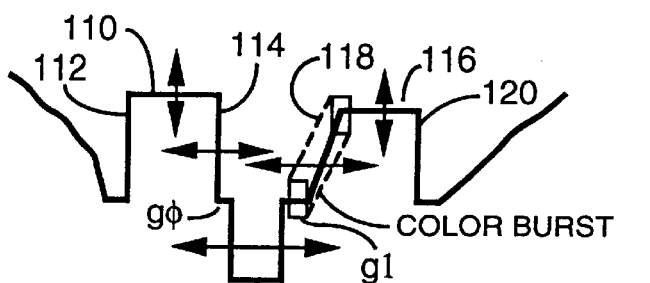
FIG. 9A
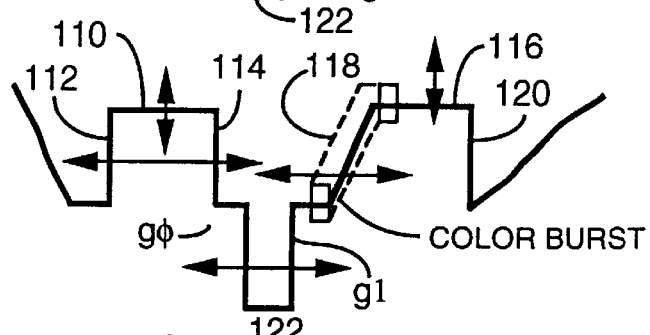
FIG. 9B
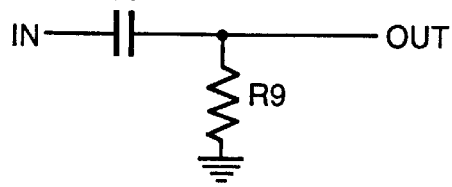
FIG. 9C FIG. 10C OS 150 
FIG. 10D OS 124 
FIG. 10E OS 152 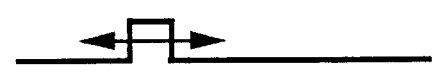
FIG. 10F g$\phi$ 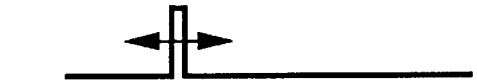

FIG. 10H g1 
FIG. 10I BURST GATE 
FIG. 10J ECP 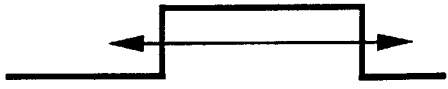
FIG. 10K ECPLIM 

METHOD AND APPARATUS FOR GENERATING A SIGNAL THAT DEFEATS ILLEGAL CABLE DECODERS

REFERENCE TO PROVISIONAL APPLICATION

This application claims priority to provisional application Ser. No. 60/093,705 filed Jul. 22, 1998 and Ser. No. 60/100,043 filed Sep. 11, 1999.

CROSS REFERENCE TO RELATED APPLICATIONS

This invention is related to International Application PCT/US98/05163 filed on Mar. 17, 1998, by Quan; U.S. Provisional Application 60/069,815 filed on Dec. 15, 1997, now U.S. application Ser. No. 09/212,336 filed Dec. 15, 1998, and U.S. Provisional Application 60/076,087 filed Feb. 26, 1998, now U.S. application Ser. No. 09/233,922 filed Jan. 22, 1999, by Quan. It is also related to U.S. Pat. No. 5,438,620 by Ryan et al. issued on Aug. 1, 1995. All the above are incorporated by reference.

FIELD OF INVENTION

This invention relates to video cable scrambling systems, and more particularly relates to a method and apparatus for inserting or otherwise adding a jamming signal in a video signal to defeat the illegal video cable decoders also known as cable "black boxes".

BACKGROUND OF INVENTION

In many scrambled cable systems today, illegal cable black boxes are used to present a viewable or stable picture. These cable black boxes are effective in neutralizing sync suppressed scrambled video systems. It has also been found that some video scrambling systems using vertical sync suppression and/or horizontal sync modulation are also vulnerable to these cable black boxes. By using relatively simple circuitry with at least one manual control, the operator with a cable black box adjusts the control until a viewable picture is seen.

Referring to the FIG. 1, in those black boxes with at least one adjustment, the video level is adjusted via an amplifier 12, and then supplied to a low pass filter 14 and a comparator 16. The comparator then generates a vertical timing signal V reset for a television sync generator circuit 18 which also receives a horizontal timing signal from a filter/slicer circuit 20. Once a reliable vertical reset pulse is established (output) by the comparator 16, the sync generator circuit 18 delivers composite sync for a viewable picture via a switcher 22. Even with sync suppressed video signals, the comparator 16 picks out the normally blanked lines in the vertical interval and generates a suitable vertical reset signal.

In yet another type of cable black box, the color burst of the video signal is used for illegal decoding. In this case, the lack of color burst in some lines of the vertical, blanking interval identifies the vertical sync area. Thus, for a cable black box such as shown in FIG. 2, the color burst is relied upon to provide the illegal decoding process. More specifically, the lack of burst in the vertical blanking interval (VBI) allows for the illegal generation of a reliable vertical rate reset signal. The fact is that in most video signals, scrambled or not, burst is not present for about 9 lines in the VBI. Thus in FIG. 2, the scrambled video signal is bandpass filtered in a filter 24 to provide a burst envelope signal which is supplied to a detection amplifier 26 and a phase lock loop (PLL) circuit 28. The detection amplifier senses the burst envelope. A one shot 30 triggers off the burst envelope leading edge and supplies a pulse which extends into the next video line (e.g., is 50 microseconds) and thus is referenced to the color burst, not the video signal. A one shot 32 provides a short pulse (of about 2 to 3 microseconds) as a burst gate to the PLL circuit 28, which also receives the burst envelope signal. The PLL circuit 28 supplies a burst signal and a clock reference to a sync regenerator circuit 36. A retriggerable one shot 34 is triggered by the one shot 30 pulse and provides a pulse which is slightly longer than one video line, and which thus extends through the active video field so that the one shot 30 no longer sees the burst envelope. At this point the retriggerable one shot 34 turns off during most of the VBI (e.g., for about 20 video lines). Thus, the output of one shot 34 comprises a regenerated vertical rate pulse, which is supplied to the sync regenerator circuit 36. The latter circuit 36 supplies new sync/burst signals as well as an insert control signal to a switch circuit 38. The switch circuit 38 also receives the scrambled video signal and, in response to the insert control signal, inserts the new sync/burst signals to descramble the signal sufficiently to provide a viewable video signal to an unauthorized user via an amplifier 40.

SUMMARY OF THE INVENTION

It is then an object of the present invention to counter illegal cable black boxes by providing modifications in the scrambled signal to neutralize and/or offset the illegal operation of the cable black boxes.

To illustrate, with regards to the illegal black box circuit of FIG. 1, the present invention provides an added signal which jams or disrupts the illegal operation of the black box. Thus, a key to creating the added signal, that is, an unreliable vertical signal for the cable black box of FIG. 1, is to cause the comparator, e.g., comparator 16, to generate an erroneous vertical reset signal. In an embodiment of this invention, lines near and within the vertical blanking interval are modified. This modification can consist of removing the broad vertical pulses of the vertical sync and then adding and/or inserting a jamming, i.e., unreliable, vertical signal in lines near the bottom and top portions of the active field. This jamming signal is also added or inserted to lines in the vertical blanking interval (VBI) that do not have data and/or reference signals. For simplicity, the unreliable vertical signal can be a time varying (for example, pedestal) voltage, of about blanking level to about peak white video level, during at least a portion of each modified horizontal line. As a result of the unreliable vertical signal around and within the vertical blanking interval area, the cable black box (such as shown in FIG. 1) outputs an unstable video signal, resulting in a concealed picture.

With regards to the black box typified in FIG. 2, the present invention again provides an added signal which jams or disrupts the operation of the black box. To defeat this type of black box, new color burst can be put into those lines normally lacking color burst in the VBI. Color burst itself may also be modified, in frequency for example, such that only an authorized decoder can transform a modified burst into the correct one. Alternate variations to that of modifying the burst can be an added signal in the form of a change in burst location, that is, in line and/or pixel locations. Also the burst signal itself may be modified so that the cable black box receives the wrong color burst signal (i.e. burst frequency) while the authorized decoder senses the correct color burst. By making the cable black box sense the wrong burst, the timing circuitry within the cable black box will deliver erroneous counts thereby causing an unstable video signal output.

BRIEF DESCRIPTION OF THE DRAWINGS

FIG. 3A illustrates a conventional television signal in the region of the vertical blanking interval (VBI) and its vicinity.

FIG. 3B illustrates a modified television signal for defeating a cable black box such as that illustrated in FIG. 1. The vertical (broad) sync pulses are removed and/or modified. Also lines designated by "A" have a jamming signal inserted and/or added. The jamming signals cause the cable black box to mis-trigger and produce an unstable output.

FIG. 3C illustrates a modified television signal for defeating a black box such as that of FIG. 2, wherein color burst is inserted and/or added to those lines in the VBI vicinity that lacks color burst. The inserted and/or added burst is designated by "B". Note these added and/or inserted color bursts can be applied to the technique of FIG. 3B as well.

FIG. 8A illustrates a conventionally scrambled signal with position modulated syncs.

FIG. 8B illustrates a slightly improved scrambled signal which adds an edge-fill and/or added signal with edge modulation. S1 denotes a standard slice level for a sync separator, while S2 denotes the slice level for an illegal cable black box which still can provide a viewable picture.

FIGS. 9A-B illustrate a modification in the technique of FIG. 8 where the edge fill signal now includes a form of amplitude modulation, with FIG. 9C depicting an associated circuit.

FIGS. 10A-10K are waveforms illustrating various timing signals related to the edge fill modulation circuitry of FIG. 11.

DESCRIPTION OF THE PREFERRED EMBODIMENTS

Figure 1:
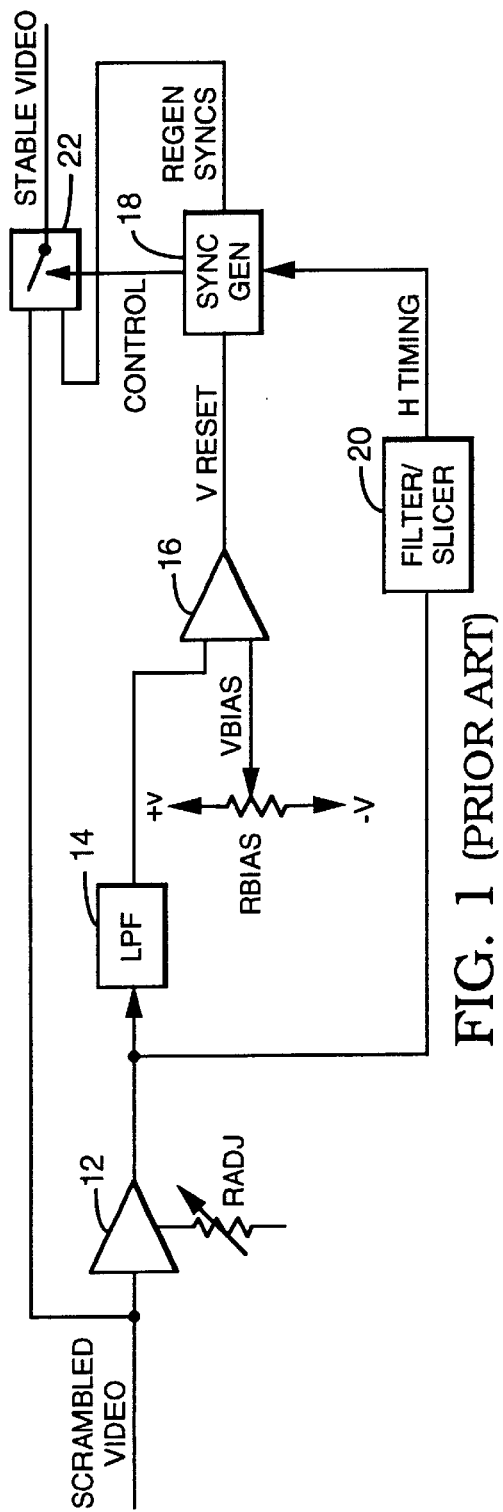
FIG. 1 illustrates a typical illegal cable television decoder with adjustment for video gain and/or threshold levels.

FIG. 1 illustrates an illegal cable black box that works by adjusting the video level and/or bias voltage into the high gain amplifier 12 of previous mention. Generally in a scrambling system, there are some lines in the VBI vicinity that are of fixed level (i.e., around blanking level). By adjusting the video gain and or bias into the inputs of the comparator 16, a vertical rate (V Reset) signal is produced. V Reset synchronizes the sync generator circuit 18 in a vertical fashion. Optional horizontal timing into the sync generator circuit is established by extracting horizontal rate signals via the filter/slicer circuit 20. Circuit 20 may be similar to circuit 16 and may also have filters and phase lock loop oscillators and/or slicing circuits. The sync generator circuit 18 then reinserts a stable sync into the video signal via the switching circuit 22, whose output then is a video signal with replaced stable syncs and a viewable picture.

It should be noted that if vertical sync pulses are present in a scrambled signal, the decoder of FIG. 1 will decode without too much problem. If the scrambled signal is missing vertical sync signal, then the circuit of FIG. 1 will "slice" or detect at a level around or above blanking level. Since there is usually at least one line in the VBI vicinity near blanking level, a somewhat stable vertical rate signal will be available through the comparator 16 and a somewhat stable picture will be displayed. Under these conditions, the operator may have to periodically readjust the video gain and/or bias (slicing threshold of comparator 16) for a stable picture when the average picture level of the program video varies.

FIG. 3B shows a solution to neutralizing the cable black box by removing (at least some of) the broad vertical sync pulses and/or eliminating some of the pre and post horizontal equalizing pulses and adding a jamming signal in lines, as designated by the notation "A", wherein "A" designates the lines available for inserting the jamming signal in the VBI and its vicinity in accordance with the invention. FIG. 3A illustrates a conventional television signal in the VBI and vicinity. It is acknowledged that in scrambling systems, there are always some television lines reserved for DATA and reference signals in the VBI area. Therefore for authorized decoder compatibility, the jamming signal will be inserted, for example, in the VBI where there are no DATA and/or reference signals for the authorized decoder, and in the lines before and after the VBI. Because of overscan conditions in television sets, some of the jamming signals can be placed about 5 lines before and/or after the VBI. In some cases, the DATA and reference signal can tolerate a level shifted signal added to cause problems for the cable black box. The jamming signal can be a fixed or varying signal. For a fixed signal, for example, a 30% white signal may suffice. For a varying signal, the last few lines of the active field can be averaged and the average voltage can be used as the jamming signal.

Yet another method of the invention is to interpolate the average luminance voltage from the bottom of the field to the top of the field. This interpolated (average) voltage then is used to "fill" in the lines in the VBI. See the waveforms 46, 48 (or 53, 55) of the circuit of FIG. 4. Filling in the non data and/or reference lines with a jamming signal in accordance with the invention, causes a black box operator to have to constantly readjust the cable black box for momentary stability. Part of the reason there is momentary stability is that the black box now is using the video signal as a source for a vertical rate reset signal. When the average picture levels change during the video program, the black box will have a different threshold level for a vertical reset signal which requires the continuous operator readjustment.

The preferred jamming signal (for, e.g. FIG. 1) is to insert and/or add a voltage that varies, or is in the range, from about blanking level to about peak white level. In this manner, the jamming signal may be amplitude, and/or position and/or pulse width modulated. The rate of modulation can be, for example, at about 11 Hz (periodic or random), although many other frequencies or waveforms will also cause black box instabilities. Note, each filled line may also have independent (for example, jamming) source generators. In the preferred embodiment, the varying signal is asynchronous with the video field rate, and thus causes the black box's comparator to generate unstable vertical signals.

Figure 4:
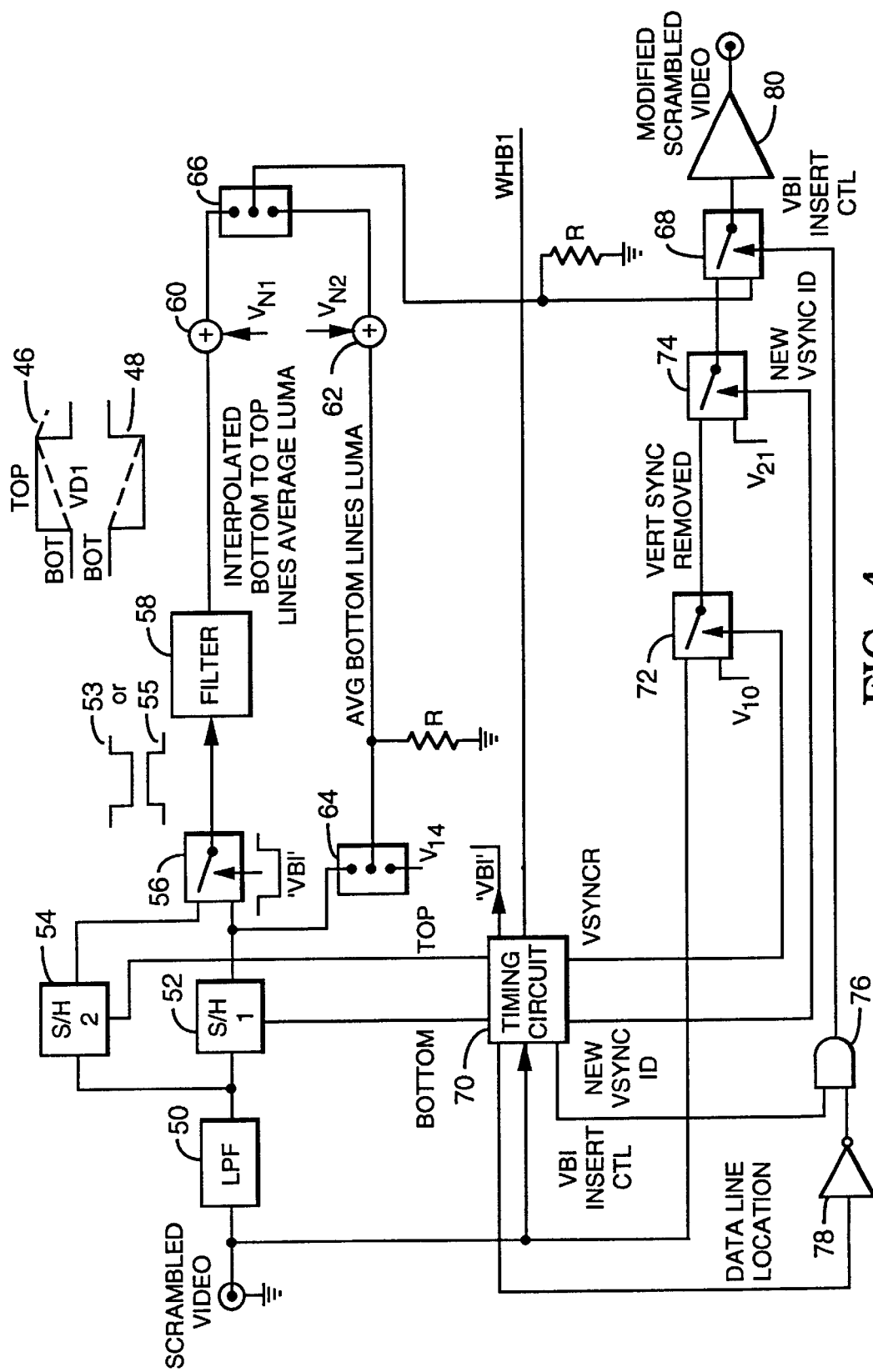
FIG. 4 and FIG. 5 are block diagrams illustrating circuitry in accordance with the invention for defeating cable black boxes typified in FIG. 1.

FIG. 4 thus illustrates a block diagram of a circuit for neutralizing a cable black box of the type illustrated in FIG. 1. Video is fed to a low pass filter 50 to average the luminance (luma) video voltage. Sample and hold circuits 52, 54 then store the average bottom picture and top picture luminance values, respectively, as depicted by waveforms 53, 55 (or 46,48). A switch 56 supplies thus a signal that contains the bottom TV field luminance values before the VBI and the top TV field luminance values during the VBI. An interpolation filter 58 such as a low pass filter, filters the output of switch 56 and supplies it to a summing circuit 60. The other input to summing circuit 60 is a signal source, such as a varying voltage, VN1, varying over a voltage range within the overall range of from about blanking to about peak white level. The output of summing circuit 60 then supplies an interpolated voltage ranging from the bottom picture luminance values to the top picture luminance values, plus any "dithering" supplied from VN1. The dotted lines on the waveforms 46, 48 show examples of the interpolated response of filter 58.

For a simpler approach, one can store the average luminance values from the bottom TV field and add an optional dithering voltage, VN2. Although VN2 may be similar to VN1, it may be independent. This is done through a summing circuit 62. Of course if a constant voltage (i.e., 30% white level) is chosen, then a voltage V14 is connected to an input of the summing circuit 62 via a selector circuit 64 with the additional optional dithering noise voltage VN2 supplied to circuit 62. If just a varying voltage is desired, then VN2 can be set to vary and the other input of the summing circuit 62 can be set to zero for example. A selector circuit 66 is coupled the outputs of the summing circuits 60, 62 and thence to one input of a switch 68.

The video is fed to a timing circuit 70 to generate signals coincident with the VBI, top and/or bottom portion of the TV field, and DATA and/or reference signal line location. Timing circuit 70 also generates a signal VSYNCR that controls the removal (or reduction) of the vertical sync (i.e., broad vertical signal pulses). A switch circuit 72 is activated by the signal VSYNCR and outputs a signal substantially free of vertical sync signals. Because the broad vertical sync pulses are removed, it may be necessary to supply a new vertical sync identification signal, VSYNC ID for authorized decoding. VSYNC ID can be a signal anywhere in the video signal and does not have to be of field rate. The signal VSYNC ID is inserted via a switch circuit 74 whose output then is a video signal without standard vertical sync signal with an identification signal for the authorized decoder (identified as VSYNC ID).

The timing circuit 70 inserts the jamming signal by controlling the switch 68 of previous mention. An AND circuit 76 and an inverter 78 control the insertion of the signal from the selection circuit 66 or the switch 74 during the active lines in the VBI area (and/or lines near it) not necessarily including lines with DATA or reference signals in the VBI. The output of an amplifier 80 then has jamming signals inserted and vertical syncs removed or reduced, to cause instabilities for a cable black box of the type for example in FIG. 1.

Figure 5:
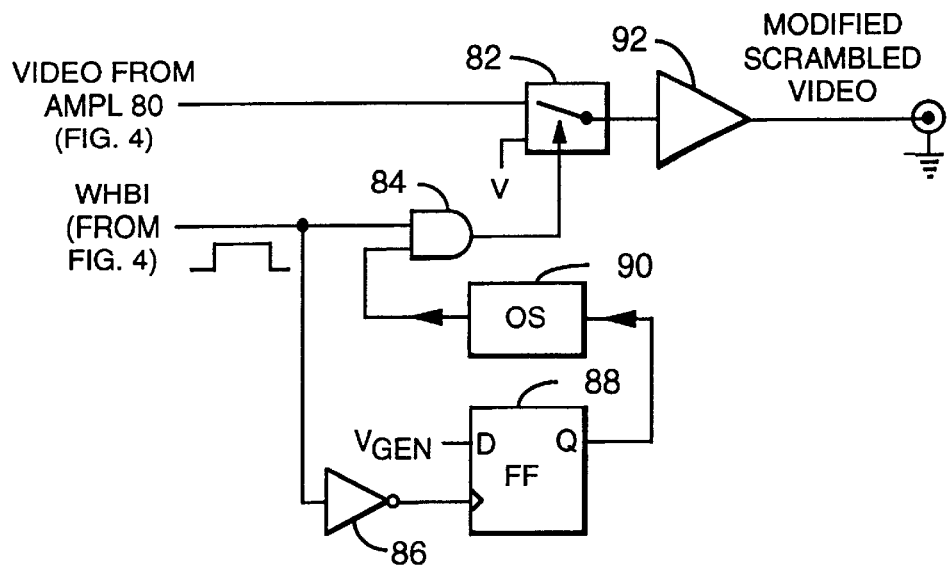

FIG. 5 illustrates an alternative embodiment of a circuit that inserts wider than normal horizontal sync pulses (one or more per TV field) to the video signal at a preferably non synchronous rate (for example 27 HZ). This wide horizontal sync pulse is used to further cause instabilities in the cable black box. By inserting wider than normal horizontal syncs, the cable box may sense these as vertical sync pulses. Since these pulses occur preferably asynchronously to the field and/or frame rate, the cable black box develops an erroneous vertical reset upon detecting them. A circuit 82 inserts the wider than normal sync pulses along with a color burst.

A horizontal rate signal, WHBI, which is about 13 microseconds for example and may be supplied from FIG. 4, is fed to one input of an AND gate 84. WHBI also is supplied to an inverter gate 86, whose output is used to clock in an asynchronous signal, VGEN. The signal VGEN can be any waveform such as for example, a 27 HZ signal. VGEN is fed to the "D" input of a flip flop 88, whose output is fed to an optional one line one shot, or half shot, timing circuit 90. The output of timing circuit 90 (if used) is fed to the other input of the AND gate 84, whose output becomes logic high for a duration of about 13 microseconds (for example) at a 27 Hz rate and during a widened horizontal blanking interval. The switch 82 then inserts the wide or modified sync with color burst accordingly into the incoming video signal, which then is outputted via an amplifier 92.

Figure 2:
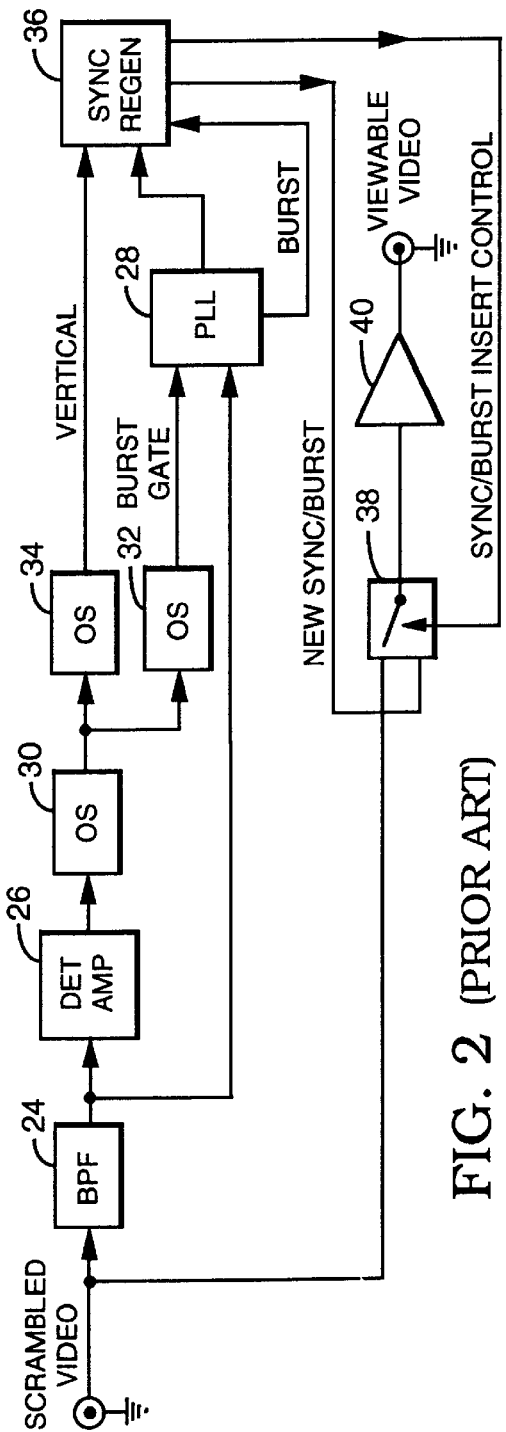
FIG. 2 illustrates another illegal cable decoder that relies on the use of color burst.
Figure 2A:
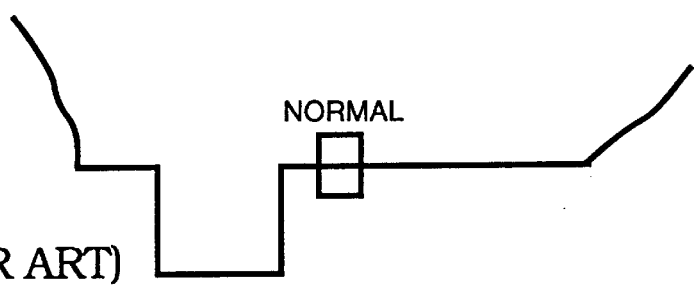
FIG. 2A illustrates a standard color burst for a television signal.
Figure 2B:
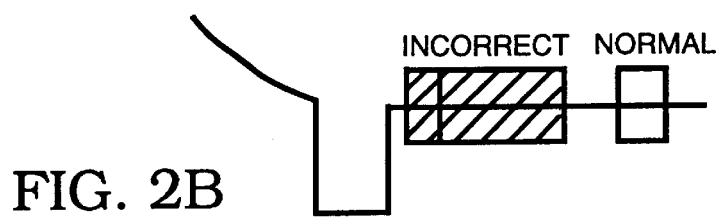
FIG. 2B illustrates a modification of color burst in accordance with the present invention by placing a wrong color burst signal where normal color burst is and then relocating normal color burst elsewhere.
Figure 2C:
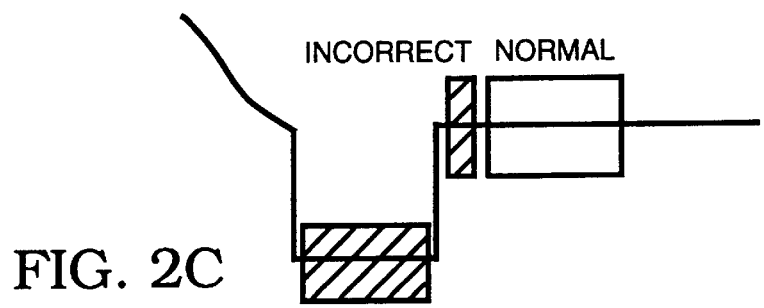
FIG. 2C illustrates a variation in the present invention of placing a wrong color burst signal in the sync area vicinity to upset the cable black box relying on burst. Normal burst is relocated elsewhere as depicted.

To neutralize the cable black box, such as in FIG. 2, the color burst can be modified such as in FIG. 2B, FIG. 2C and/or FIG. 3C to cause the cable black box to generate an unstable output. In contrast, FIG. 2A illustrates a standard color burst signal in an HBI. Modifications as illustrated in FIG. 2B or FIG. 2C that have the wrong color burst frequency will cause the cable black box to count incorrectly in its sync regeneration circuit. When the VBI is filled with color burst, leaving no lines in the television signal without burst, the cable black box then has no way of referencing a vertical signal. Note the burst filled in the VBI as shown in FIG. 3C may have normal color burst and/or the type of burst modifications as shown in FIG. 2B and FIG. 2C. Also burst may be reduced or modified at various locations in the VBI vicinity so as to cause the cable black box to have an unstable vertical signal.

Figure 6:
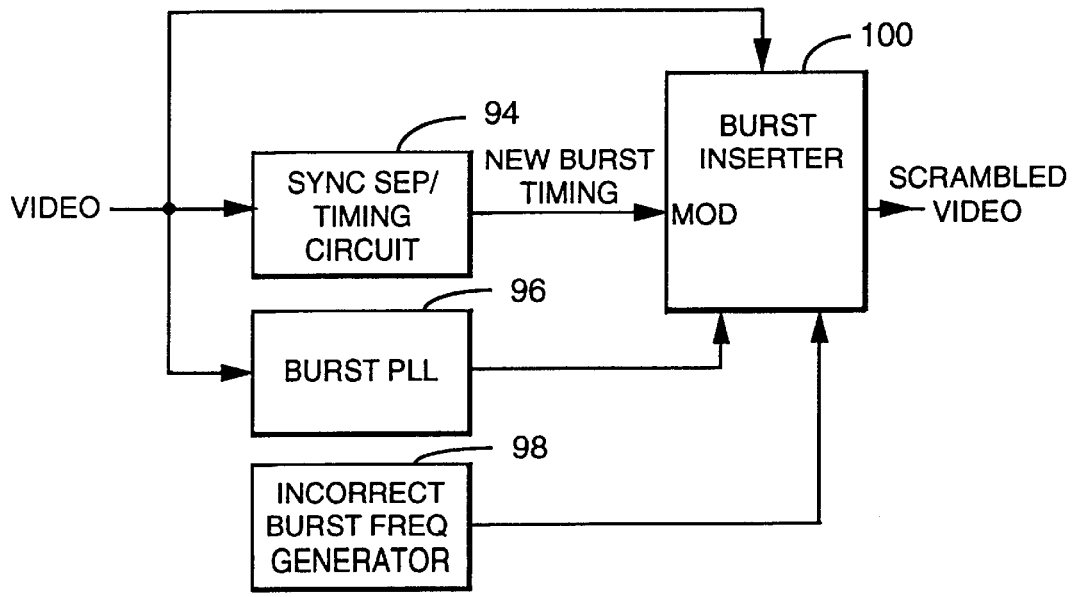
FIG. 6 is a block diagram illustrating circuitry in accordance with the invention for defeating a cable black box typified in FIG. 2.

FIG. 6 illustrates a way to modify a video signal such that the burst has incorrect frequencies. To this end, video is fed to a sync separator/timing circuit 94. A burst phase lock loop oscillator 96, is locked to the input's video signal. A generator 98 with the incorrect frequency is fed to a modified burst inserter circuit 100. Circuit 100 also receives timing and color burst signals as well. The output of circuit 100 then generates a video signal that causes cable black boxes dependent on burst to misbehave while allowing an authorized decoder to work properly.

Figure 7A:
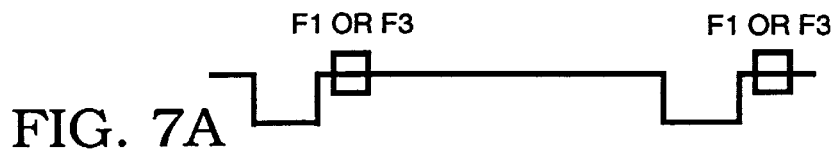
FIG. 7A illustrates a modified color burst signal of the invention where the color burst frequency is not necessarily the correct frequency. The frequencies of color burst (envelopes) F1 and/or F3 are different from the nominal burst frequency, and may be changed from line to line or field to field.
Figure 7B:
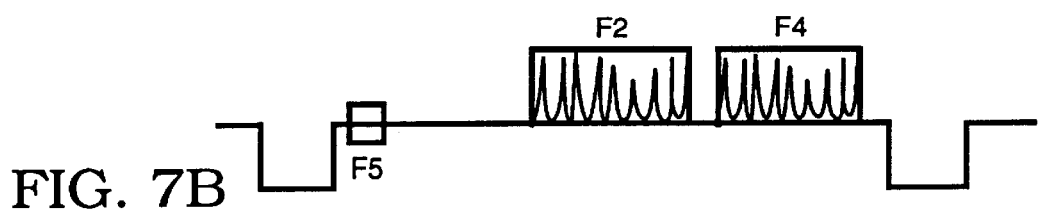
FIG. 7B illustrates a modified optional color burst signal of the invention F5 for reference, and includes on that line color burst reference frequencies, F2 and F4.

FIG. 7A illustrates a burst modification provided, for example, throughout the active field including the VBI. This modification applies the burst at a frequency such that the cable black box will lock to an erroneous frequency and thus cause an unstable output. To recover the thusly scrambled signal, the correct color frequency, at least one line per field for example, is set aside for reference signals as shown in FIG. 7B. A correct color frequency is provided by multiplying the modified bursts of FIG. 7A by a continuous wave version of frequency F2 or F4. The continuous wave version of F2 and/or F4 is accomplished by known phase lock loop oscillator techniques. With the scrambler's DATA as a control signal, the correct frequency is chosen for authorized decoding. FIG. 7E illustrates at the output of a band pass filter 102 (BPF) the correct color subcarrier frequency and/or phase, provided by a multiplier 104 and selected frequencies F1 or F3 with F2 or F4.

Figure 7C:
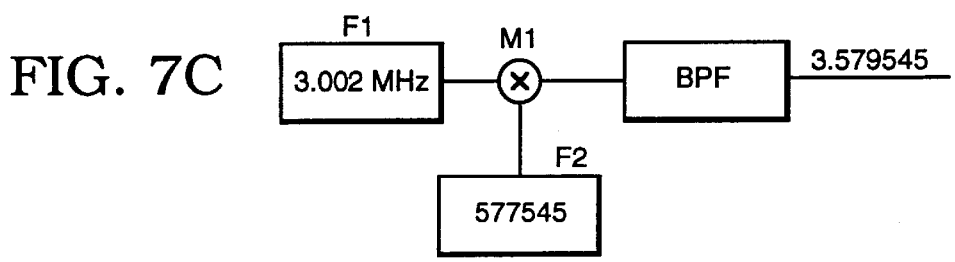
FIG. 7C and FIG. 7D are block pictorial diagrams of the invention, illustrating how mixing for the sum frequency of F1 and F2, or F3 and F4 produces the correct color frequency the encoder and/or authorized decoder.
Figure 7D:
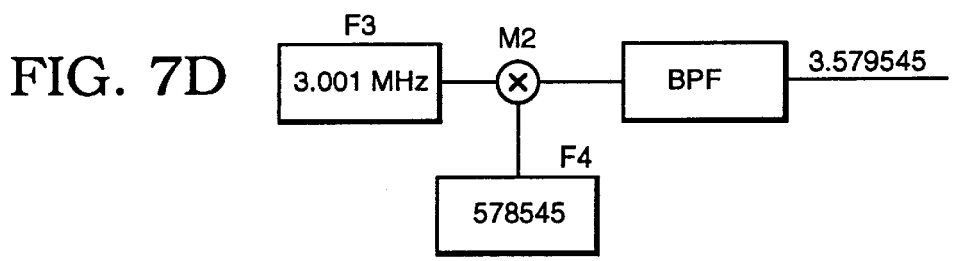
Figure 7E:
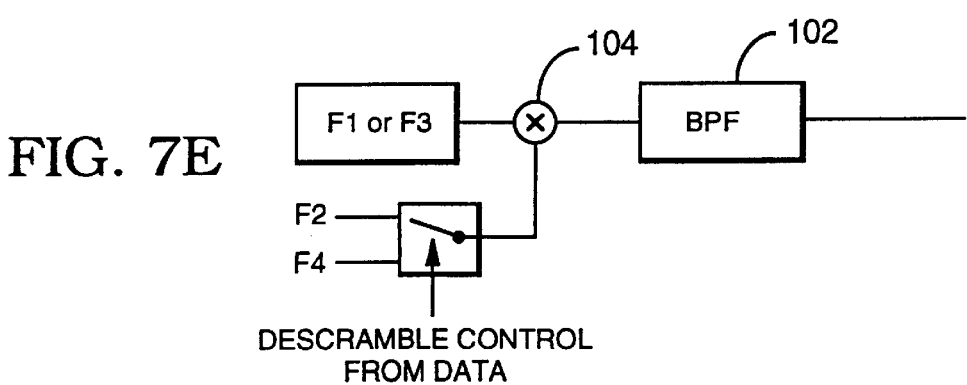
FIG. 7E is a block pictorial diagram of the invention, illustrating how the correct combination of frequencies F2 or F4 is used to generate the correct color subcarrier frequency for the authorized decoder, using the DATA for the decoder.

FIGS. 7C and 7D are simple examples of multiplying selected bursts by selected continuous wave frequencies. It should be noted that two different pairs of frequencies (for modified burst and reference frequency) can be used for extra security, as shown in FIG. 7E.

Referring back to FIG. 1, one can see that the cable black box achieves its "sync" signal by providing slicing for the sync separator at levels generally above blanking level. See RADJ and RBIAS of FIG. 1. Thus, the inserted and/or added jamming signals in the VBI vicinity (FIG. 3B for example) cause erroneous vertical reset signals for the cable black box. The reason is that the jamming signals are the signals that are sliced or sensed since the jamming signals vary from about blanking level to about peak white level.

It turns out that it may be possible to modify the scrambled signal such that the cable black box substantially senses a modulated or position modulated signal regardless of adjustments. FIG. 8A illustrates a previously scrambled video signal with sync modulation. However, an end of line edge 106 delivers a stable edge for the cable black box when it is adjusted for sensing above blanking level, even though an erroneous clamp pulse (ECP) signal has its leading edge 108 modulated. As illustrated in FIG. 8B, if a signal 107 is added by edge fill and/or insertion, then a blanking sensing level S2 still will not supply a defeating position modulated signal to the cable black box because of the fact that the leading edge of the signal 107 and the trailing edge of an erroneous clamp pulse (ECP) 109 still are stable and detectable by the black box even though the edges 106 and 108 are modulated.

FIG. 9A illustrates a modification of FIG. 8B which overcomes the problems of FIG. 8B in that an edge fill signal 110 and/or an ECP signal 116 now include a form of amplitude modulation. That is, in FIG. 9A, although a leading edge 112 of the signal 110 and a trailing edge 120 of signal 116 are fixed, the trailing edge 114 is position modulated and the edge fill signal 110 and the ECP signal 116 are amplitude modulated so that the stable edge 112 increases and decreases with time, i.e., periodically drops below the black box slice level S2, thereby causing an unstable edge and enhanced concealment. The modulation of the edge fill and ECP signals can be tied together or can each be modulated at a respective rate. A further, even more effective embodiment is shown in FIG. 9B where both edges of the edge fill signal 110 are position modulated along with the amplitude modulation. It has been found with some illegal cable decoders, that more effectiveness is achieved by modulating the edge fill signal 110. Further, turning on and off (or modulating) the edge fill signal and/or the ECP signal (as for example designated by numerals 110, 112, 114 and 116, 118, 120 in FIGS. 9A and 9B), causes the illegal decoder to generate an even more unviewable picture. Modulating the edge fill signal can be in the form of pulse width, pulse amplitude, pulse coding and/or frequency transformations and/or frequency modulation techniques.

The fact that some of these decoders may also differentiate or high pass filter the video signal is illustrated for example in the circuit of FIG. 9C. As a result of high pass filtering, edge 114 in FIG. 9A, for example, can be a sync locking signal. By turning on and off this edge at an annoying rate (i.e., 500 milliseconds on and 200 milliseconds off), the illegal cable decoder and/or TV set causes a more unviewable picture.

FIGS. 9A and 9B also show modulated erroneous clamp pulse signals (ECP) 116. By modulating the ECP signal at an annoying rate (i.e., 1.5 Hz), the illegal cable decoder and/or TV set may display a more annoying picture by periodic picture shifts and/or darkening.

FIGS. 9A and 9B also show a preferable finite rise time for the ECP signal leading edge 118 and a fixed trailing edge 120. This finite rise time is used sometimes to allow the decoder's chroma circuits to lock on to the position modulated burst (riding on top of the ECP's amplitude modulated leading edge) without phase lock loop errors. It has been found when the rise time of edge 118 is at least 100 nanoseconds, for example, the decoder will output a stable and substantially error free subcarrier burst signal.

Figure 10A:
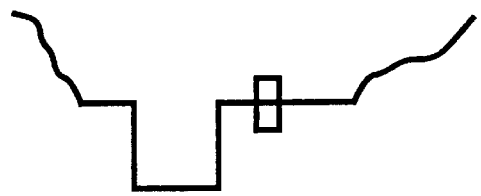
Figure 10B:
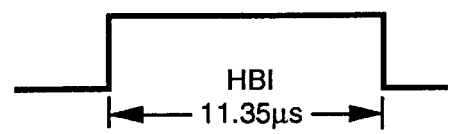

FIGS. 10A through 10K illustrate waveforms that generate the signals as shown in FIGS. 9A and 9B. FIG. 10B shows a starting timing signal, HBI, that is preferably larger than the normal horizontal blanking period (i.e., about 11.3 microseconds).

FIG. 10C is timed off the leading edge of FIG. 10B. It is varied by a modulating signal such that the trailing edge of FIG. 10C is for example from about 100 nanoseconds to about 5.6 microseconds. FIG. 10C triggers a timing circuit one shot to generate the signal as seen in FIG. 10E. FIG. 10E is then the not yet modulated version of pulse 110 and edges 112, 114 of FIG. 9B.

The yet to be modulated version of pulse 110 and edges 112, 114 of FIG. 9A are generated by the waveform as seen in FIG. 10D which is generated by a varying one shot off the leading edge of signal HBI, FIG. 10B. The variation of pulse widths of FIG. 10D is from about 500 nanoseconds to about 6 microseconds (for example).

Gap $g^o$, (FIGS. 9A, 9B) is designated in FIG. 10F and is normally a fixed (sometimes varied) pulse which is triggered off the trailing edge of FIG. 10D or 10E. This gap, $g^o$, is generally very small (i.e., less than 300 nanoseconds).

Figure 10G:
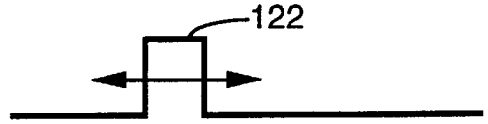

An actual sync modulation signal 122, FIG. 10G, for concealment in unauthorized viewing is generated by a timing circuit from the trailing edge of FIG. 10F or 10E or 10D. The pulse width of 122 in FIG. 10G is typically fixed (although can be also varied) at about 3 to 4 microseconds (for example). In some TV sets displaying a signal that has a horizontal sync width less than about 3 microseconds, the sync modulation is not effective for concealment.

FIG. 10H illustrates another gap signal, g1, used by the decoder to establish a video reference level such as blanking level. The signal g1 is triggered off the trailing edge of signal 122 and has a duration of about 500 nanoseconds to 2 microseconds. A duration of about 1.2 microseconds is typical for signal g1, although other durations can be used for g1.

A burst gate signal shown in FIG. 10I is used to reinsert color burst as shown in FIGS. 9A and 9B. It is triggered off the trailing edge of signal 122, the modulated sync signal.

The waveform of FIG. 10J is timed off the trailing edge of gap pulse g1 and becomes the basis for the ECP signal 116. In turn, FIG. 10K represents the unprocessed version of the ECP signal 116 as shown in FIGS. 9A and 9B. FIG. 110K shows an ECP signal within the HBI, which is preferable, while FIG. 10J shows an ECP signal which may at times be outside the HBI.

Figure 11:
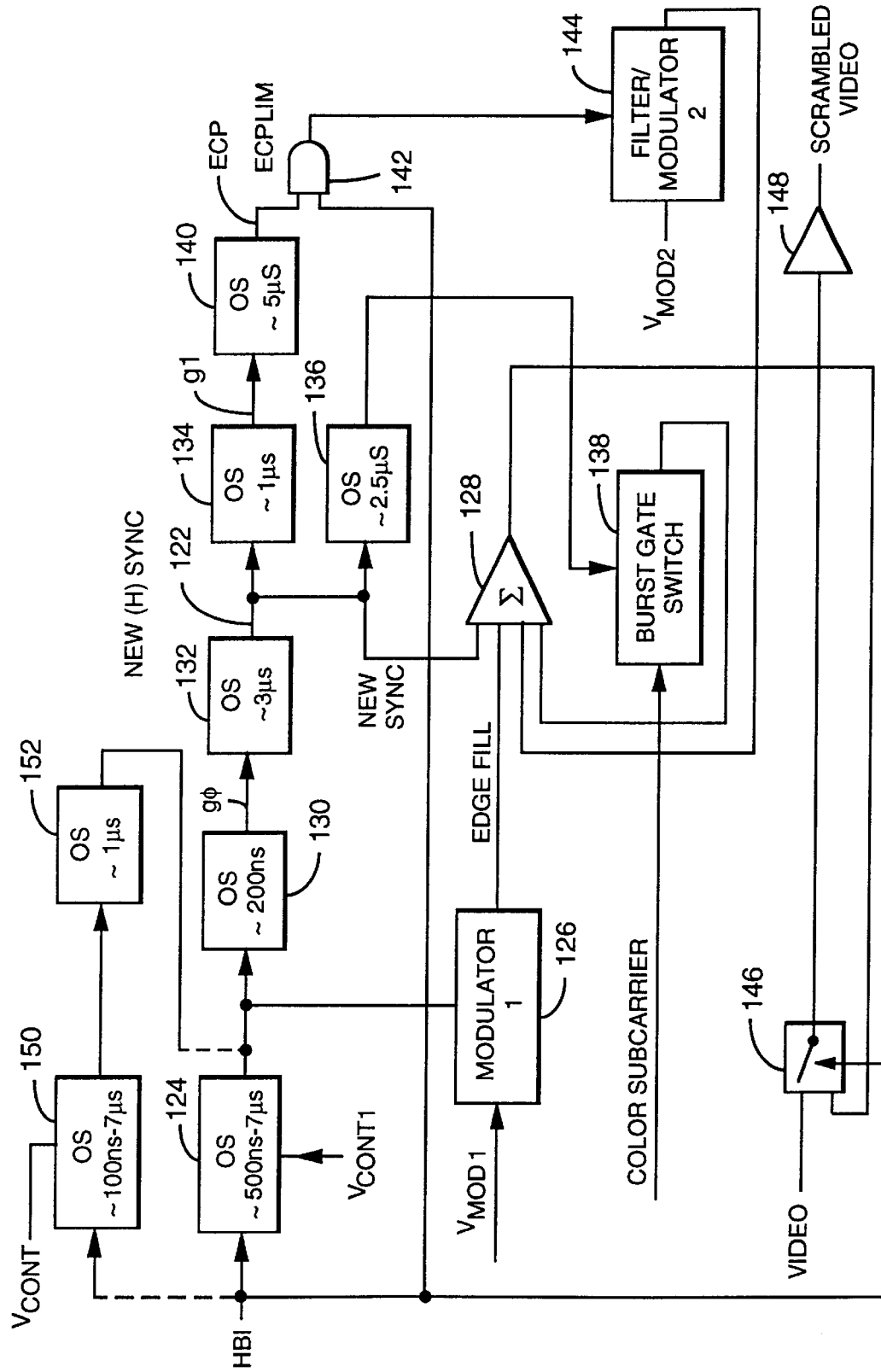
FIG. 11 is a block diagram of the invention illustrating an implementation of the apparatus for providing the improved scrambling signals to defeat illegal cable decoders and/or TV sets.

FIG. 11 illustrates an implementation of the apparatus for generating the improved scrambling signals for illegal cable decoders and/or TV sets. Thus FIG. 11 is an example of an apparatus that produces signals similar to those shown in FIGS. 9A and 9B.

To generate the improved scrambling signal, the horizontal blanking signal HBI as described previously and shown in FIG. 10b is used as a "master" timing signal. A one shot timing circuit OS 124 triggers off the leading edge of the HBI to generate a signal as shown in FIG. 9A. the OS 124 output pulse width is varied by a control voltage, Vcont1 which determines the scrambling pattern as displayed on the TV through the illegal cable decoder and/or just through the TV set. It was found by experimentation that a frequency in the range of 450 HZ to 700 HZ (for example) provides the maximum concealment. For instance, in NTSC, the preferred frequency of Vcont1 is about 603 Hz with a variation of about 5.5 microsecond. It should be noted that the variation of OS 124 can be larger (varied from about 500 nano-seconds to 7 microseconds) given a longer duration of HBI, for example, which may cause a slight loss in active video in the horizontal direction for the authorized decoded output.

The output of OS 124 is fed to a modulator 126 which is controlled by a signal Vmod1. The output of modulator 126 is then preferably an amplitude modulated edge fill signal that is fed to an input of a summing amplifier circuit 128.

The gap signal $g^\phi$ of previous mention is generated by a OS 130 which is triggered by the trailing edge output of OS 124. A new (modulated) sync signal (122 of FIG. 10G), is generated by a OS 132 which is fed to an input of the summing amplifier circuit 128 and is triggered by the trailing edge of gap pulse $g^\phi$. The trailing edge of signal 122 triggers a OS 134 to generate the gap signal g1 of previous mention. Signal 122 also triggers a OS 136 for a burst gate signal which in turn controls a burst gate switch 138. The output of burst gate switch 138 is regenerated color burst for a signal such as shown in FIGS. 9A and 9B and is fed to another input of the summing amplifier circuit 128. A color subcarrier signal is regenerated by way of a chroma phase lock loop circuit or equivalent (not shown) and is fed to the input of the burst gate switch 138.

A OS 140 generates the ECP signal 116 (FIGS. 9A, 9B, 10J) by triggering off the trailing edge of gap g1. The output of OS 140 is fed to an AND gate 142. The other input of AND gate 142 is the HBI signal and the output of ECPLIM is then a limited pulse width ECP signal which in turn is fed to another modulator circuit 144 with an optional filter for finite ECP rise and/or fall time. Modulator 144 is controlled by a signal Vmod2 to preferably amplitude modulate the ECPLIM signal. The output of modulator 144 is fed to yet another input of amplifier circuit 128.

The HBI signal controls a switch 146 to insert in the "expanded horizontal blanking interval" during at least a portion of the active field, the modulated edge fill, modulated sync, new burst, and modulated ECP signal as shown in FIG. 9A. The output of switch 146 is amplified by an amplifier circuit 148 whose output is fed to an RF modulator in the cable system (not shown) for example to transmit the improved scrambled signal for better concealment in TV sets and/or illegal cable decoders.

To generate a signal in which the edge fill signal is position modulated such as shown in FIG. 9B, the OS 124 is replaced with a OS 150 and a control voltage Vcont along with a OS 152, as illustrated in the FIG. 11 via phantom lines.

FIG. 9C depicts an example of the type of high pass filter or differentiator circuit that may be used in illegal cable decoders to sense edges of the video signal. These edges can provide just enough horizontal and/or vertical rate signals for the illegal cable decoder to lock up to provide unauthorized viewing. The illegal cable decoder however can be "fooled" into sensing the wrong vertical rate signal if the parts of the video signal are modified as shown in FIG. 12.

Figure 12A:
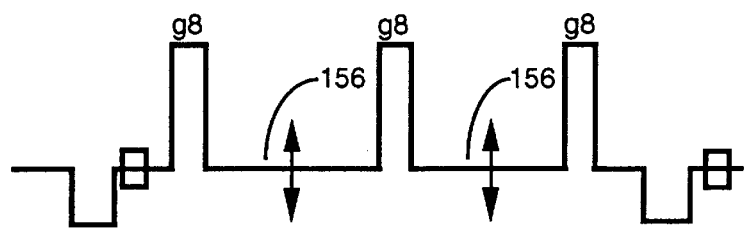
FIGS. 12A-12D are waveforms illustrating portions of the video signal waveform that are modified so that an illegal cable decoder can be "fooled" into sensing the wrong vertical rate signal.
Figure 12B:
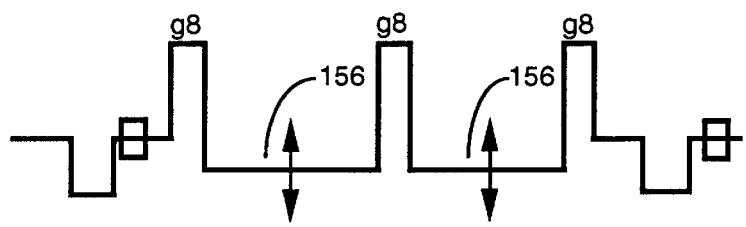
Figure 12C:
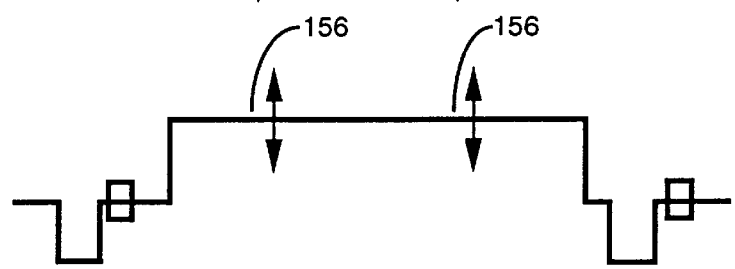
Figure 12D:
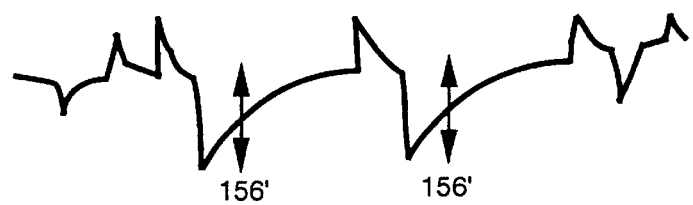

By providing a gap signal, g8, as shown in FIGS. 12A and 12B, a "fake" vertical signal is produced in conjunction with an amplitude modulated fake broad(vertical) pulse signal, 156. Because signal 156 moves up and down (i.e., from −10 IRE to +100IRE in NTSC for example), a differentiated version of the waveforms of FIGS. 12A–C results in a waveform illustrated in FIG. 12D. Note in FIG. 12D, the larger differentiated "vertical sync" signals 156' are amplitude modulated. As a result, the illegal cable decoder will experience sporadic vertical locking. The signals as designated in FIGS. 12A–C are preferably in the vertical blanking interval vicinity (and can move around or vary in number of lines) with preferably, the real vertical syncs removed and replaced as illustrated at the output of FIG. 4. For instance, signals of FIGS. 12A–C can be inserted in place of the control signal V14 in FIG. 4. For simplicity only one video line is shown with the modification described above, whereas other lines can be modified.

Alternatively, a few lines of the waveforms shown in FIGS. 12A–C can be inserted after amplifier circuit 80 of FIG. 4. The gap(s) g8, plays an important role since it mimics the serrated vertical syncs of a normal vertical sync signal. The locations of g8 are important as to cause the illegal decoder to lock up incorrectly. FIG. 12 is an example of g8 locations, whereby it should be noted that the number and locations of gaps g8 are not limited to those shown in FIGS. 12A–B. The signals 156 of FIGS. 12A–C can also extend to −40 IRE as long as the authorized decoder will still decode correctly. Also the gap g8 may be varied in width, or may be eliminated in selected situations.

Figure 13:
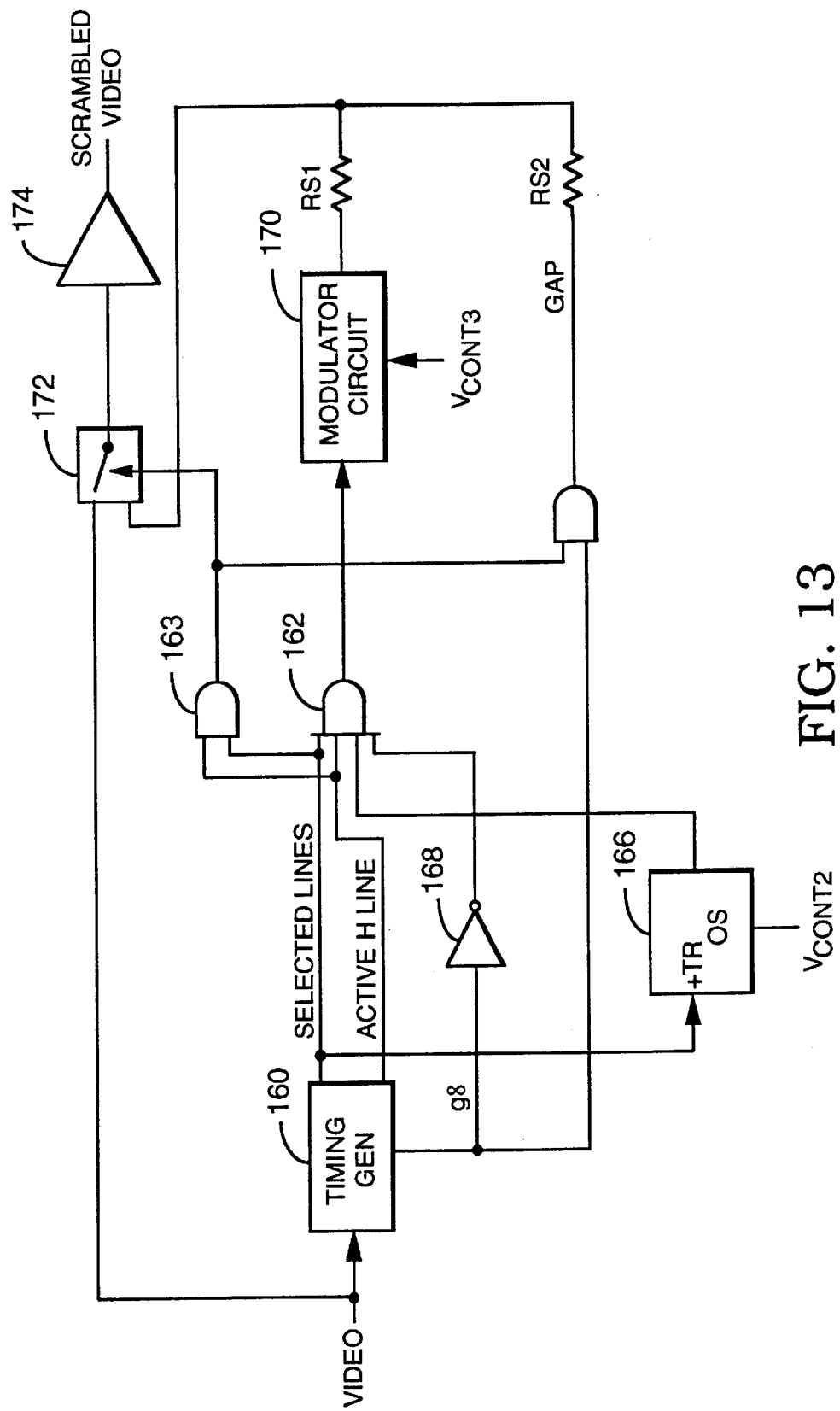
FIG. 13 is a block diagram illustrating an implementation of the invention for generating, for example, the waveforms shown in FIGS. 12A-C.

Before an explanation of FIG. 13 is discussed, it should be noted that in FIG. 4, not all the TV lines of the vertical blanking intervals need to be filled with a varying pedestal voltage (as shown in FIGS. 12A-C). With needed data lines, it has been found that a varying pedestal voltage (i.e. at a rate of 9.4 HZ from −10 IRE to +100 IRE) inserted in some of the lines in the vertical blanking interval (VBI) and its vicinity is sufficient to cause problems for the illegal decoder (and/or TV set). The key is to fill in the varying voltage or pedestal into those unused, blanked and/or static signal lines in the VBI and its vicinity.

FIG. 13 illustrates an implementation to generate, for example, the waveforms as shown in FIGS. 12A–C. For effective concealment the circuit of FIG. 13 can be used in any combination with the circuit of FIG. 11 and/or FIG. 4. In FIG. 13, video is fed to a timing circuit 160, one output of which defines selected lines around the VBI. Another output of circuit 160 defines the active horizontal line. AND gates 162, 163 use these two signals to control or to insert the modified signal as described for example in FIGS. 12A–C. The selected lines signal from circuit 160 is fed to a timing circuit OS 166, which is provided with a control signal Vcont2 which varies the pulse width of the OS 166. Generally OS circuit 166 applies pulse width modulation on the selected lines signal, the duration of which may be for example 635.5 microseconds or 10 lines of duration, or a range of varying line durations. The output of OS circuit 166 may vary between 31 microseconds (a half line) to 635.5 microseconds (ten lines).

The output of timing circuit 160 also outputs the gap signal g8. An invertor circuit 168 inverts the logic level of g8 to blank the output of the AND gate 162 during the g8 signal. The output of AND gate 162 then is a logic high version of the signal 156 in FIGS. 12A–B. A modulator circuit 170 preferably amplitude modulates the output of AND gate 162 via control signal Vcont3. The modulator circuit 170 can be other types of modulators such as pulse width, position, PCM, FM, and the like modulators. By using summing resistors RS 1 and RS2, the varying signal 156 controlled by the signal Vcont is summed with the g8 signal into an input of a switch 172. The output of switch 172 is amplified by circuit 174 which generates a signal as shown in FIGS. 12A–C with optional pulse width modulation and/or truncation of g8 and/or signals 156 in particular selected lines.

It has been found in certain circumstances, that the ECP signal will restore the horizontal concealment caused by the positional sync modulation. The following concealment summary describes the reaction of a TV set not including the illegal cable decoder.

With no vertical sync and positional horizontal syncs, edge fill with an ECP signal shows more (horizontal tearing) concealment than without an ECP signal. If the edge fill is turned completely off, there is no difference in concealment whether ECP is on or off. In addition, concealment is less.

With vertical sync pulses turned on 50% of the time and at different locations (as defined as vertical mod1) from one field to the next, there is little change in concealment whether ECP or edge fill is turned on or off. If the vertical mod1 has sporadic blanking on the vertical sync pulses, then it is found that the best concealment is achieved when edge fill is turned off and ECP turned on (although turning off ECP caused a minor drop in concealment). If edge fill is turned on, then the concealment is worse whether ECP is on or off.

For best concealment in illegal cable decoders, it should be noted that the vertical sync pulses are blanked. Thus the best combination (in some cases) consists of edge fill with ECP.

Although the invention has been described herein relative to specific embodiments, various additional features and advantages will be apparent from the description and drawings, and thus the scope of the invention is defined by the following claims and their equivalents.

What is claimed is:

1. Method of disrupting the operation of an illegal black box normally used to overcome an unstable or unviewable video signal caused by a scrambling process, wherein the illegal black box would normally provide a stable or viewable picture to an unauthorized user of the black box, comprising:

generating an added signal which will disrupt the operation of the illegal black box; and superimposing or inserting said added signal in the unstable scrambled video signal during a time duration which at least encompasses vertical blanking intervals of the video signal to prevent the illegal black box from generating the stable or viewable picture.

2. The method of claim 1, wherein:

the added signal is a time varying voltage generally of from blanking level to peck white level; and the step of superimposing or inserting includes;

removing the broad vertical pulses of the vertical sync from selected video lines generally in the vertical blanking interval; and adding the added signal in the selected video lines generally in the vertical blanking interval.

3. The method of claim 1 wherein:

the added signal is a line fill signal whose video level follows the program signal level of the scrambled video signal; and the step of superimposing or inserting includes inserting the line fill signal into the scrambled video signal during the vertical blanking interval.

4. The method of claim 3 wherein the line fill signal comprises an interpolation of the luminance values of the last and first video values in video lines around the vertical blanking interval.

5. The method of claim 3 including:

amplitude modulating the level of the line fill signal.

6. The method of claim 1 wherein:

the added signal is a color burst signal; and the step of superimposing or inserting includes;

adding the color burst signal to each of the video lines in the vertical blanking interval that normally do not include color burst signals.

7. The method of claim 1 wherein:

the added signal is an incorrect modification of a proper color burst signal; and the step of superimposing or inserting includes;

inserting the incorrect modification of the proper color burst signal in place of the proper color burst signal in the horizontal blanking intervals of respective video lines in the vertical blanking intervals; and relocating the proper color burst signal within the horizontal blanking intervals.

8. The method of claim 1 wherein:

the added signal is an incorrect modification of a proper color burst signal; and the step of superimposing or inserting includes;

inserting the incorrect modification of the proper color burst signal in the horizontal sync vicinity of respective video lines; and relocating the proper color burst signal within the horizontal blanking intervals of respective video lines in the vertical blanking interval.

9. The method of claim 7 or 8 wherein the incorrect modification of the proper color burst signal has an incorrect color burst frequency.

10. The method of claim 1 wherein:

the added signal includes a position modulated erroneous clamp pulse; and the step of superimposing or inserting includes:

adding an edge fill or insertion signal at the end of the respective video line; and modulating the added edge fill or insertion signal as well as the erroneous clamp pulse.

11. The method of claim 10 including:
  position modulating the added edge fill or insertion signal; and
  amplitude modulating the added edge fill or insertion signal along with the position modulation.

12. The method of claim 10 wherein the edge fill or insertion signal is pulse width, pulse amplitude, pulse code or frequency modulated and/or frequency transformed.

13. The method of claim 10 including:
  modulating the erroneous clamp pulse at a rate generally of 1.5 Hz to cause periodic picture shifts and/or picture darkening.

14. The method of claim 10 wherein the modulated leading edge of the erroneous clamp pulse is position modulated at a finite rise time which allows locking an to the position modulated color burst signal.

15. The method of claim 1 wherein:
  the added signal includes a fake vertical signal having gap signals in conjunctior with an amplitude modulated fake broad pulse signal; and
  the step of superimposing or inserting includes;
  adding the fake vertical signal to the unstable scrambled video signal in selected video lines in the vertical blanking interval.

16. The method of claim 15 wherein the level of the amplitude modulated fake broad pulse signal is generally in the range of −10 IRE to 100 IRE in the NTSC standard.

17. The method of claim 1 including:
  generating the added signal as averaged bottom picture luminance values before the vertical blanking interval and top picture luminance values at the end of the vertical blanking interval;
  interpolating the luminance values during the vertical blanking interval; and
  dithering the interpolated luminance values via a varying voltage ranging generally from blanking level to peak white level.

18. Apparatus for disrupting the operation of an illegal black box used by unauthorized users to overcome an unstable or unviewable video signal, wherein the illegal black box would normally provide a stable or viewable picture from the unstable or unviewable scrambled video signal, comprising:
  means receiving the scrambled video signal for generating an added signal capable of disrupting the operation of the illegal black box; and
  means responsive to the generating means for superimposing or inserting the added signal in the scrambled video signal generally in vertical blanking intervals thereof to produce corresponding additional unstable or unviewable video signals.

19. The apparatus of claim 18 wherein:
  the generating means include a timing circuit for providing timing signals indicative of the vertical blanking interval and vicinity; and
  circuit means for generating the added signal selectively and generally in the vertical blanking intervals; and
  the superimposing or inserting means include inserter circuit means responsive to the timing circuit for adding the added signal to the unstable or unviewable scrambled video signal at the selected times generally in the vertical blanking intervals.

20. The apparatus of claim 19 wherein the circuit means for generating include:
  sample circuit means for storing an average bottom picture luminance value before the vertical blanking interval and an average top picture luminance value at the end of the vertical blanking interval;
  filter means for interpolating the average bottom and top luminance values across the vertical blanking interval; and
  summing means coupled to the filter means and responsive to a varying voltage source for dithering the interpolated luminance values to provide a dithered added signal.

21. The apparatus of claim 19 wherein the circuit means for generating include:
  a voltage source;
  summing means coupled to the voltage source and responsive to a second varying voltage for providing a dithered added signal.

22. The apparatus of claim 21 wherein the voltage source is a constant voltage at a selected video white level.

23. The apparatus of claim 21 wherein:
  the voltage source includes sample circuit means for storing an average bottom picture luminance value before the vertical blanking interval; and
  the summing means is responsive to the second varying voltage for dithering that average bottom picture luminance value to provide the dithered added signal.

24. The apparatus of claim 19 including:
  a switching circuit receiving the scrambled video signal for removing the vertical sync pulses in response to the timing circuit;
  a second switching circuit responsive to the timing circuit for replacing the removed vertical sync pulses with an identification signal capable of being detected by an authorized decoder; and
  wherein said inserter circuit means selectively outputs a scrambled video signal with vertical syncs removed and said added signals inserted.

25. The apparatus of claim 24 wherein the inserter circuit means is responsive to a vertical blanking interval insert control signal and a line location signal from the timing circuit to control the insertion process during active lines in and around the vertical blanking interval.

26. The apparatus of claim 19 including:
  means for providing wider than normal horizontal sync signals asynchronously to the field and/or frame rate; and
  switch means receiving the combined scrambled video signal with said added signal, for inserting the wider than normal horizontal sync signals therein.

27. The apparatus of claim 19 including:
  a color burst phase lock loop oscillator locked to the scrambled video signal for supplying a correct color burst signal;
  an incorrect burst frequency generator for supplying a color burst signal of incorrect burst frequency;
  said inserter circuit means being responsive to the timing circuit for replacing the correct color burst signal with the incorrect frequency color burst signal, for relocating the connect color burst signal and/or for inserting the correct color burst signal into all video lines in the vertical blanking interval.

28. The apparatus of claim 27 wherein the correct color burst frequency is recovered during authorized decoding, with the apparatus including:
  multiplier means for multiplying the incorrect frequency color burst signal by a continuous wave reference frequency signal; and a band pass filter for providing the correct color burst frequency signal.

29. The apparatus of claim 19 including:
means for providing a horizontal blanking interval (HBI) signal;
summing amplifier means coupled at its output to the superimposing or inserting means; and
wherein the timing circuit includes first multivibrator means triggering off the HBI signal and responsive to a Vcont control signal for providing an edge fill signal.

30. The apparatus of claim 29 wherein:
the circuit means for generating include, modulator means coupled to the multivibrator means and responsive to a Vmod control signal for supplying an amplitude modulated edge fill signal as the added signal to the summing amplifier means.

31. The apparatus of claim 29 wherein the circuit means for generating include:
second multivibrator means responsive to the first multivibrator means for providing a new horizontal sync signal to the summing amplifier means.

32. The apparatus of claim 31 wherein the second multivibrator means further generates a first gap signal in response to the first multivibrator means.

33. The apparatus of claim 31 wherein the circuit means for generating include:
third multivibrator means responsive to the second multivibrator means, for providing an erroneous clamp pulse as the added signal; and
second modulator means responsive to a second Vmod control signal for supplying an amplitude modulated erroneous clamp pulse to the summing amplifier means.

34. The apparatus of claim 33 including:
an AND gate responsive to the HBI signal for supplying the erroneous clamp pulse to the second modulator means.

35. The apparatus of claim 33 wherein:
the second multivibrator means include a one shot circuit responsive to the first multivibrator means for providing a first gap signal at the end of the edge fill signal, and a second one shot circuit for providing the new horizontal sync signal after the first gape signal; and
the third multivibrator means include a third one shot circuit responsive to the second multivibrator means for providing a second gap signal after the new horizontal sync signal.

36. The apparatus of claim 33 including:
fourth multivibrator means responsive to the new horizontal sync signal for providing a burst gate; and
a burst gate switch responsive to the burst gate for supplying a regenerated color burst signal to the summing amplifier means.

37. The apparatus of claim 33 wherein:
the inserter circuit means include an output switch receiving the scrambled video signal and responsive to the HBI signal for supplying the scrambled video signal with the regenerated color burst signal inserted therein.

38. The apparatus of claim 33 wherein:
the inserter circuit means include an output switch receiving the scrambled video signal and responsive to the HBI signal for supplying the scrambled video signal which induces the edge fill signal, the new horizontal sync signal and/or the erroneous clamp pulse.

39. The apparatus of claim 38 including modulators for amplitude modulating the edge fill signal and/or the erroneous clamp pulse.

40. The apparatus of claim 33 wherein:
the inserter circuit means includes an output switch receiving the scrambled video signal and responsive to the HBI signal for supplying the scrambled video signal which includes the edge fill signal and the amplitude modulated erroneous clamp pulse at said selected times.

41. The apparatus of claim 19 wherein:
the timing circuit provides a selected lines signal, an active horizontal line signal and a gap signal;
means for supplying an inverted gap signal;
multivibrator means for applying modulation to the selected lines signal;
an AND gate responsive to the selected lines signal, the active horizontal line signal, the inverted gap signal and the modulated selected lines signal for providing a fake vertical signal with a fake broad vertical pulse signal;
a modulator circuit responsive to the AND gate for providing a fake vertical signal with an amplitude modulated fake broad vertical pulse signal; and
wherein the inserter circuit means adds the fake vertical signal with the amplitude modulated fake broad vertical pulse signal to the video signal in response to the selected lines signal and the active horizontal line signal.

42. Method of defeating an illegal black box it used to overcome the effect of a scrambled video signal thereby presenting an unviewable picture to an unauthorized user of the black box comprising:
generating a jamming signal of unreliable vertical rate signal characteristics; and
superimposing or inserting the jamming signal on the scrambled video signal during a time duration which at least encompasses vertical blanking intervals of the video signal to cause the illegal black box to generate unstable vertical rate signals and thus the unviewable video signal;
wherein:
the jamming signal is a time varying voltage generally of blanking level to peak white level; and
the step of superimposing or inserting includes:
removing the broad vertical pulses of the vertical sync from selected video lines generally in the vertical blanking interval; and
adding the jamming signal in the selected video lines generally in the vertical blanking interval.

43. Method of defeating an illegal black box used to overcome the scrambling effect of a scrambled video signal thereby presenting an unviewable picture to an unauthorized user of the black box comprising:
generating a jamming signal of unreliable vertical rate signal characteristics; and
superimposing or inserting the jamming signal onto the scrambled video signal during a time duration which at least encompasses vertical blanking intervals of the video signal to cause the illegal black box to generate unstable vertical rate signals and thus the unviewable video signal;
wherein:
the jamming signal is a line fill signal whose video level follows the program signal level of the scrambled video signal; and
the step of superimposing or inserting includes inserting the line fill signal into the scrambled video signal during the vertical blanking interval.

44. Method of defeating an illegal black box used to overcome the scrambling effect of a scrambled video signal thereby presenting an unviewable picture to an unauthorized user of the black box comprising:

generating a jamming signal of unreliable vertical rate signal characteristics; and superimposing or inserting the jamming, signal on to the scrambled video signal during a time duration which at least encompasses vertical blanking intervals of the video signal to cause the illegal black box to generate unstable vertical rate signals and thus the unviewable video signal;

wherein:

the jamming signal is a color burst signal; and the step of superimposing or inserting includes:

adding color burst signal to each of the video lines in the vertical blanking interval that normally do not include color burst signals.

45. Method of defeating an illegal black box used to overcome the scrambling effect of a scrambled video signal thereby presenting an unviewable picture to an unauthorized user of the black box comprising:

generating a jamming signal of unreliable vertical rate signal characteristics; and superimposing or inserting a the jamming signal onto the scrambled video signal during a time duration which at least encompasses vertical blanking intervals of the video signal to cause the illegal black box to generate unstable vertical rate signals and thus the unviewable video signal;

wherein:

the jamming signal is an incorrect modification of a proper color burst signal; and the step of superimposing or inserting includes:

inserting the incorrect modification of the proper color burst signal in place of the proper color burst signal in the horizontal blanking intervals or in the horizontal sync vicinity of respective video lines in the vertical blanking intervals; and relocating the proper color burst signal within the horizontal blanking intervals.

46. Method of defeating an illegal black box used to overcome the scrambling effect of a scrambled video signal thereby presenting an unviewable picture to an unauthorized user of the black box comprising:

generating a jamming signal of unreliable vertical rate signal characteristics; and superimposing or inserting the jamming signal onto the scrambled video signal luring a time duration which at least encompasses vertical blanking intervals of the video signal to cause the illegal black box to generate unstable vertical rate signals and thus the unviewable video signal;

wherein:

the jamming signal includes a position modulated erroneous clamp pulse; and the step of superimposing or inserting includes:

adding an edge fill or insertion signal at the end of the respective video line; and modulating the added edge fill or insertion signal its well as the erroneous clamp pulse.

47. Apparatus for defeating an illegal black box used by unauthorized users to provide a viewable picture from a scrambled video signal, comprising:

means receiving the scrambled video signal for generating a black box jamming signal having improper vertical rate signal characteristics; and means responsive to the generating means for superimposing the jamming signal on the scrambled video signal generally in blanking intervals thereof to produce unstable vertical rate signals which cause an unviewable video signal;

wherein:

the generating means include a timing circuit for providing timing signals indicative of the vertical blanking interval and vicinity; and circuit means for generating the jamming signal selectively and generally in the vertical blanking intervals; and the superimposing means include inserter circuit means responsive to the timing circuit for adding the jamming signal to the scrambled video signal at the selected times generally in the vertical blanking intervals.

48. Method of defeating an illegal black box used to overcome the scrambling effect of a scrambled video signal thereby presenting an unviewable picture to an unauthorized user of the black box comprising:

generating a jamming signal of unreliable vertical rate signal characteristics; and superimposing or inserting the jamming onto the scrambled video signal during a time duration which at least encompasses vertical blanking intervals of the video signal to cause the illegal black box to generate unstable vertical rate signals and thus the unviewable video signal, wherein:

the jamming signal includes a fake vertical signal having gap signals in conjunct on with an amplitude modulated fake broad pulse signal; and the step of superimposing or inserting includes:

adding the fake vertical signal to the scrambled video signal in selected video lines in the vertical blanking interval.

49. Method of defeating an illegal black box used to overcome the scrambling effect of a scrambled video signal thereby presenting an unviewable picture to an unauthorized user of the black box comprising:

generating a jamming signal of unreliable vertical rate signal characteristics;

superimposing or inserting the jamming signal onto the scrambled video signal during a time duration which at least encompasses vertical blanking intervals of the video signal to cause the illegal black box to generate unstable vertical rate signals and thus the unviewable video signal;

generating the jamming signal as averaged bottom picture luminance values before the vertical blanking interval and top picture luminance values at the end of the vertical blanking interval;

interpolating the luminance values during the vertical blanking interval; and dithering the interpolated luminance values via a varying voltage ranging generally from blanking level to peak white level.

* * * * *